(12) United States Patent
King et al.

(10) Patent No.: US 11,442,829 B2
(45) Date of Patent: Sep. 13, 2022

(54) PACKETED PROTOCOL DEVICE TEST SYSTEM

(71) Applicant: International Business Machines Corporation, Armonk, NY (US)

(72) Inventors: Ryan Patrick King, Lagrangeville, NY (US); Kevin M. Mcilvain, Delmar, NY (US); Gary A. Van Huben, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 298 days.

(21) Appl. No.: 16/819,512

(22) Filed: Mar. 16, 2020

(65) Prior Publication Data

US 2021/0286694 A1 Sep. 16, 2021

(51) Int. Cl.
| | |
|---|---|
| *G06F 11/00* | (2006.01) |
| *G06F 11/27* | (2006.01) |
| *G06F 13/28* | (2006.01) |
| *G06F 13/40* | (2006.01) |

(52) U.S. Cl.
CPC .............. *G06F 11/27* (2013.01); *G06F 13/28* (2013.01); *G06F 13/4027* (2013.01)

(58) Field of Classification Search
CPC ....... G06F 11/27; G06F 13/28; G06F 13/4027
USPC ....................................................... 714/1–57
See application file for complete search history.

(56) References Cited

U.S. PATENT DOCUMENTS

| | | |
|---|---|---|
| 7,184,408 B2 | 2/2007 | Denton et al. |
| 7,412,034 B2 | 8/2008 | Rancu et al. |
| 7,826,381 B1 | 11/2010 | Kastuar et al. |
| 8,149,730 B1 | 4/2012 | Aybay et al. |
| 8,386,867 B2 | 2/2013 | Sul et al. |
| 9,384,108 B2 | 7/2016 | Mcilvain et al. |
| 9,432,298 B1 | 8/2016 | Smith |
| 9,438,539 B1 | 9/2016 | Daniel et al. |
| 9,839,821 B2 * | 12/2017 | DeShiell ................. A63B 60/00 |
| 2006/0150000 A1 * | 7/2006 | Mizutani ............. G06F 11/1645 714/6.1 |
| 2008/0005384 A1 * | 1/2008 | Mead ....................... G06F 13/28 710/22 |
| 2009/0300419 A1 * | 12/2009 | Silverman ........... G06F 11/2294 714/E11.026 |

(Continued)

OTHER PUBLICATIONS

C F. Limones-Mora, Test Modules Design for a SerDes Chip in 130 nm CMOS technology, Jul. 2016, 155 pages.

(Continued)

*Primary Examiner* — Sarai E Butler
(74) *Attorney, Agent, or Firm* — Cantor Colburn LLP; Edward Wixted

(57) ABSTRACT

Aspects include configuring a plurality of functional self-test controllers in a test control device to run a plurality of functional test cases in parallel on a plurality of devices under test. Test traffic is arbitrated between the functional self-test controllers and a plurality of packeted protocol layer interfaces of the test control device. One or more protocol specific conversions are performed between the test traffic and a device-specific packeted protocol of each of the devices under test. Payload checking is performed between the packeted protocol layer interfaces and the devices under test to verify responses of the devices under test to the functional test cases.

20 Claims, 5 Drawing Sheets

(56) References Cited

U.S. PATENT DOCUMENTS

| | | | |
|---|---|---|---|
| 2010/0077260 A1* | 3/2010 | Pillai | G06F 11/263 |
| | | | 714/E11.178 |
| 2010/0241900 A1 | 9/2010 | Check et al. | |
| 2013/0339789 A1* | 12/2013 | Menon | G06F 11/3656 |
| | | | 714/E11.17 |
| 2014/0156253 A1* | 6/2014 | McIlvain | G06F 11/27 |
| | | | 703/28 |
| 2016/0077944 A1* | 3/2016 | Kodama | H04L 43/0888 |
| | | | 714/33 |
| 2017/0093884 A1* | 3/2017 | Al Abdulhadi | H04L 63/0428 |
| 2018/0011962 A1* | 1/2018 | Huott | G06F 30/3323 |
| 2020/0050566 A1* | 2/2020 | Hussain | G06F 11/1048 |
| 2020/0160742 A1* | 5/2020 | Hotra | G06F 3/016 |

OTHER PUBLICATIONS

Method and System for Validating an Electronics Manufacture Automatically Through High Speed Serializer Empirical Data Collection, An IP.com Prior Art Database Technical Disclosure, Authors et. al.: Disclosed Anonymously, IP.com No. IPCOM000249024D, IP.com Electronic Publication Date: Jan. 26, 2017, 3 pages.

Method for avoiding false lane detection in a High Speed Serial layered Network: An IP.com Prior Art Database Technical Disclosure, Authors et. al.: IBM, Original Publication Date: Dec. 19, 2007, IP.com No. IPCOM000165536D, 7 pages.

R. King, Aug. 16, 2019, GitHub—OpenCAPI_omi_host_fire_ An example OMI Host for testing an OMI Device, retrived from the internet: https://github.com/OpenCAPI/omi_host_fire Mar. 13, 2020, 2 pages.

S. Alaparthi, et al., Methodologies and Challenges in Testing of High-Speed I/O Interfaces, 2009, 6 pages.

S. Chiu, et al., Diagonal Test and Diagnostic Schemes for Flash Memories, Article in IEEE International Test Conference (TC), Oct. 2002, 11 pages.

S.N. Tippannanavar, et al., Components, Methods & Systems for faster verification of Serdes Cores & Testchips, An IP.com Prior Art Database Technical Disclosure, Original Publication Date: Nov. 13, 2008, IP.com No. IPCOM000176334D, 8 pages.

* cited by examiner

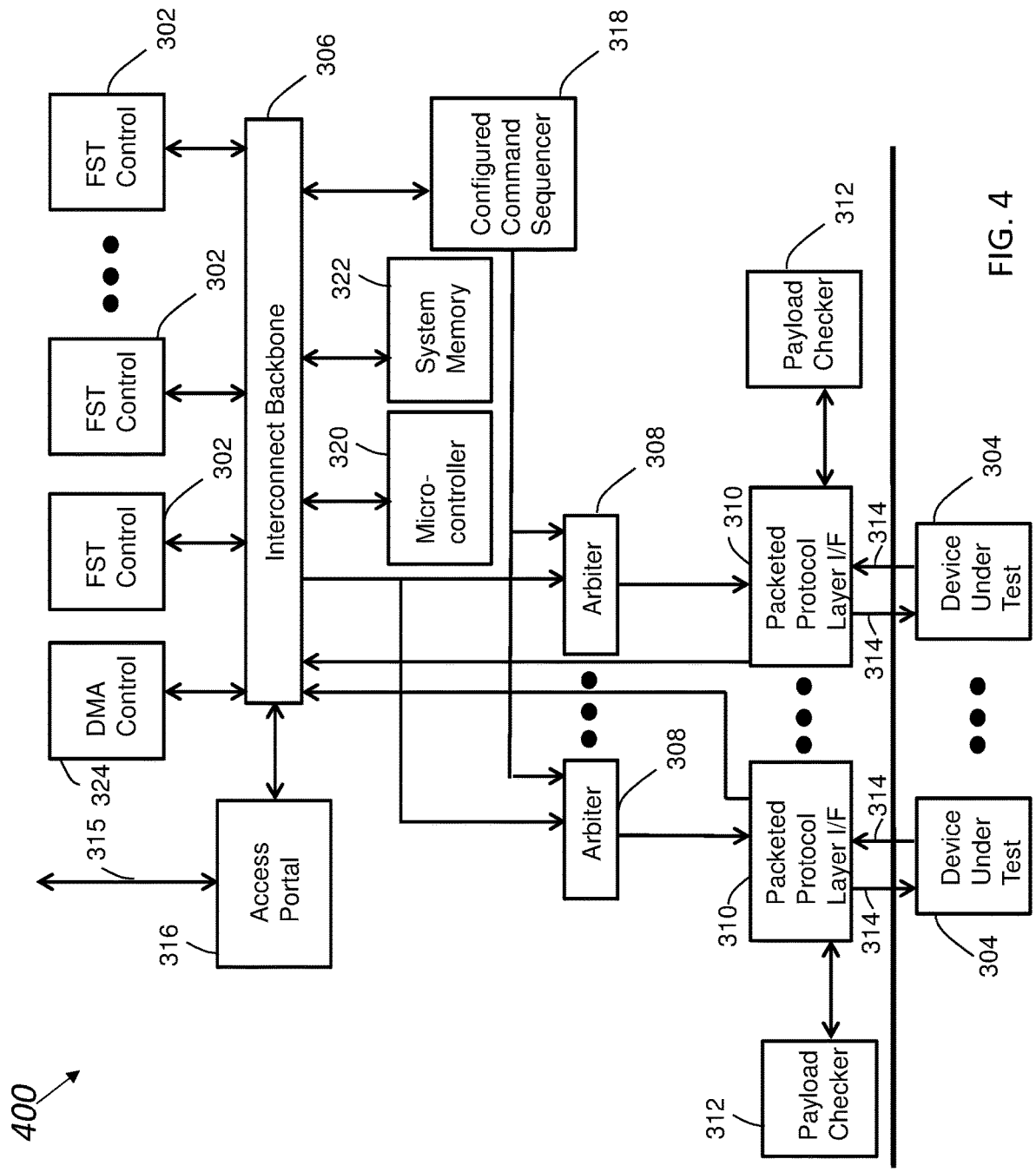

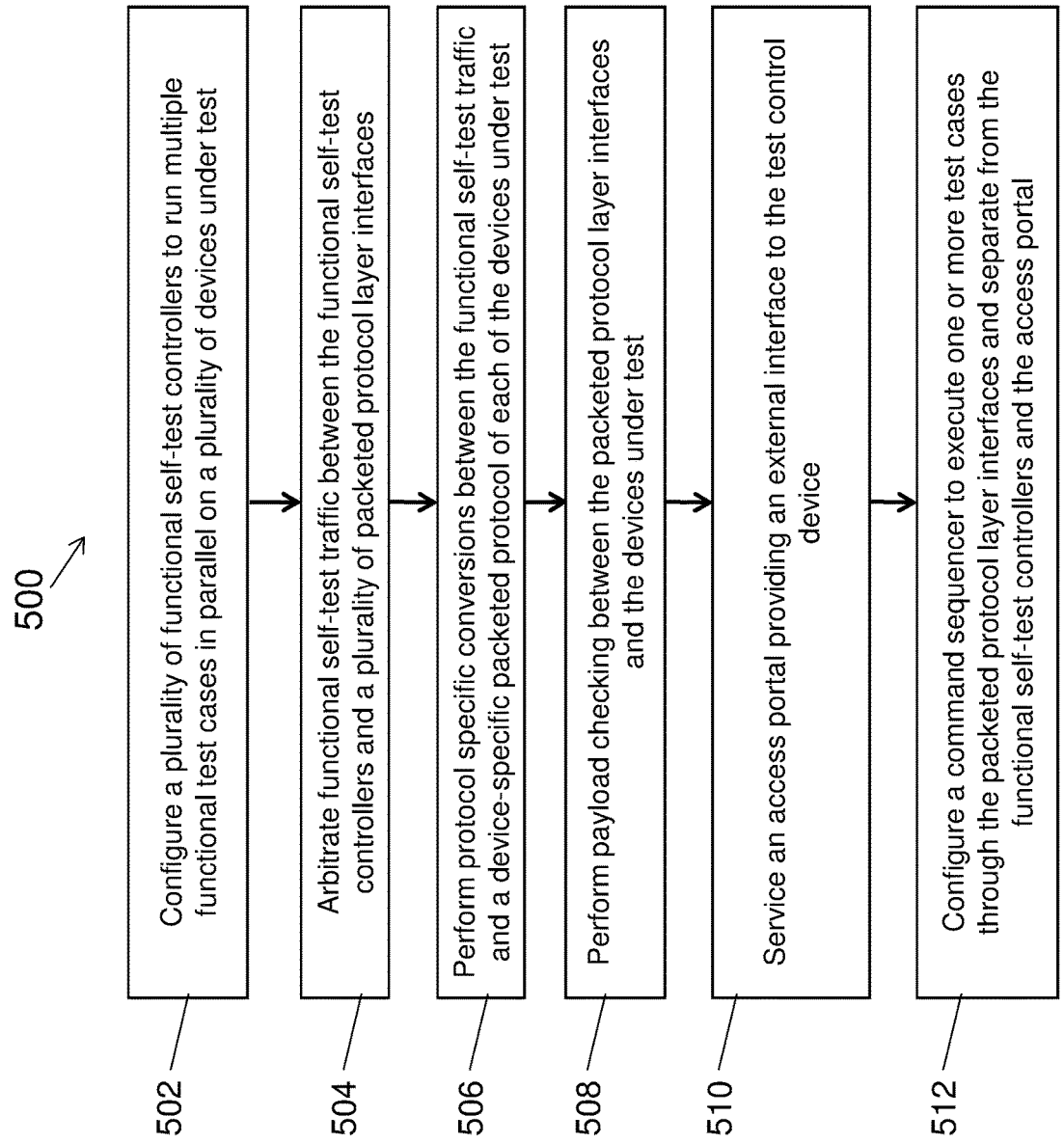

PACKETED PROTOCOL DEVICE TEST SYSTEM

BACKGROUND

The present invention relates to computer systems, and more particularly, to a packeted protocol device test system.

Memory subsystems of a computer may make use of multiple types of error checking, correction and reporting mechanisms to improve recoverability, availability, and serviceability (RAS) and data integrity. In higher-end systems, such as mainframes, it is typical for data to be checked, corrected and reported upon in many places within write and read paths. The write and read paths can include checking, correction and reporting from a memory control to a physical memory interface through chip packaging, board routing across a board into a memory device, and return paths. As memory technology has evolved, the amount of checking, correction, and reporting included in memory subsystems has expanded to enable higher speed and higher density technologies. Furthermore, as designs seek to balance power and performance, design complexity increases, which can be challenging to verify through simulation.

Memory subsystems and other computer subsystems and components can employ complex frame or packet-based protocols that increase testing complexity. Functional built-in self-test (FBIST) logic can be embedded in some designs to aid with testing beyond the typical checks performed during normal operation. However, as system complexity, density, transfer rates, and protocols evolve, the overhead associated with incorporating extensive FBIST logic within a system can become prohibitive. For example, a memory buffer chip may have limited space to physically layout a full suite of FBIST logic to provide test coverage while also enabling normal operation of the memory buffer chip within a memory system of a computer. FBIST logic within a device may also be limited in interface testing and reporting with respect to systems that are external to the device. For instance, it may be challenging to test a communication interface of a device under test from within the device under test using embedded FBIST logic. Validation testing may seek to test and stress components in ways that are not readily achievable using only built-in test features of a device under test.

SUMMARY

According to one or more embodiments of the present invention, a method includes configuring a plurality of functional self-test controllers in a test control device to run a plurality of functional test cases in parallel on a plurality of devices under test. Test traffic is arbitrated between the functional self-test controllers and a plurality of packeted protocol layer interfaces of the test control device. One or more protocol specific conversions are performed between the test traffic and a device-specific packeted protocol of each of the devices under test. Payload checking is performed between the packeted protocol layer interfaces and the devices under test to verify responses of the devices under test to the functional test cases.

Other embodiments of the invention implement the features of the above-described method in a system and in a computer program product.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a block diagram of a test control device of a packeted protocol device test system according to a non-limiting embodiment; and FIG. 5 is a flow diagram illustrating a method according to a non-limiting embodiment.

Figure 1:
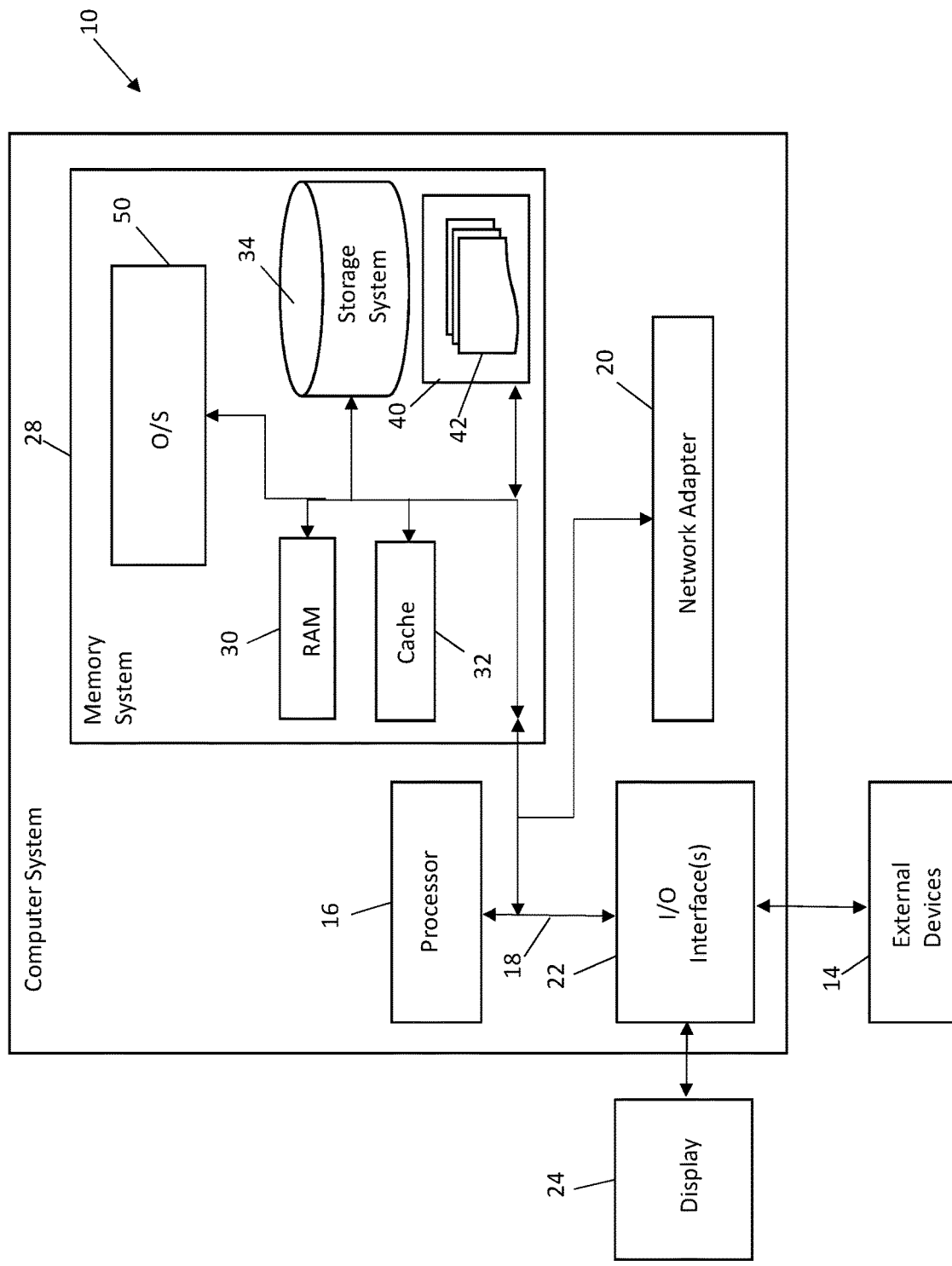
FIG. 1 is a block diagram illustrating a computer system in accordance with various embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, memory buffer chips, data buffers, register clock drivers, and similar devices that sit between a host and traditional memory or storage devices may be functionally validated by employing external test equipment for driving the interface between the host and the device. To date this has been possible because these devices employ a memory or storage interface running at similar frequencies to the memory or storage devices. This is becoming increasingly more difficult as memory and storage devices approach higher transfer rates, such as four gigabit/second (Gbps) data transfer rates. Signaling interfaces, such as differential high-speed serializer/deserializer (SerDes) interfaces, can be used to obtain higher bandwidth connections between the host and memory sub-systems. This typically requires memory buffer chips to employ advanced high-speed serialized physical interfaces with frame or packet-based protocols, which further complicates functional validation testing.

Turning now to an overview of the aspects of the invention, one or more embodiments of the invention address the above-described shortcomings of the prior art by creating a functional validation system for exercising devices that communicate through a packeted protocol interface, such as a differential high-speed SerDes (HSS) memory buffer and storage devices. The functional validation system is a part of a test system which employs autonomous functional self-test (FST) controllers for generating and checking operational sequences, as well as alternate controllers and interfaces that support manually contriving and controlling packets transmitted across the packeted protocol interface. The validation system can reside externally to devices under test, while avoiding the need to use or augment complex bed-of-nails test equipment, for example.

The test system can include a test control device, such as an application specific integrated circuit (ASIC), utilizing physical interfaces (PHYs) compatible with one or more packeted protocol interfaces. For example, the test control device can be mounted on a board with one or more sockets for plugging memory buffer devices, differential HSS dual in-line memory modules (DIMMs), or other such devices. Since the primary interface to each device under test is a packeted or frame-based protocol, the number of required input/output (I/O) connections on the ASIC is far less than a bed-of-nails tester thereby permitting a less complex and more compact test infrastructure. For enhanced configurability, the test control device can be embodied in a Field Programmable Gate Array (FPGA) device with differential HSS PHYs that can be enhanced or modified through reprogramming.

With reference now to FIG. 1, a computer system 10 is illustrated in accordance with a non-limiting embodiment of the present disclosure. The computer system 10 may be based on the IBM Z architecture or POWER architecture, for example, offered by International Business Machines Corporation (IBM). The architecture, however, is only one example of the computer system 10 and is not intended to suggest any limitation as to the scope of use or functionality of embodiments described herein. Regardless, computer system 10 is capable of being implemented and/or performing any of the functionality set forth hereinabove. Embodiments of the invention can be used to test portions of the computer system 10, may be integrated within the computer system 10, or can otherwise interface with the computer system 10.

Computer system 10 is operational with numerous other computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, elements of the computer system 10 can be incorporated in one or more network devices to support computer network functionality, such as a network switch, a network router, or other such network support devices.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, a processor 16 including one or more processing cores or processing units, a memory system 28, and a bus 18 that operably couples various system components including memory system 28 to processor 16.

Bus 18 represents one or more of any of several types of bus structures, including a memory bus or memory control, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. In embodiments of the invention, bus 18 can include HSS links and support packetized communication to one or more components of the memory system 28.

Computer system 10 may include a variety of computer system readable media. Such media may be any available media that are accessible by computer system/server 10, and they include both volatile and non-volatile media, removable and non-removable media.

Memory system 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory system 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include communication protocol support as one or more drivers to implement various protocol layers in a protocol stack (e.g., transmission control protocol/internet protocol (TCP/IP)) to support communication with other computer systems across one or more computer networks.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processor 16 is configured to execute instructions stored within the storage system 34, to communicate data to and from the memory system 28, and to generally control operations of the computer system 10 pursuant to the instructions.

Program/utility 40, having a set (at least one) of program modules 42, may be stored in memory system 28 by way of example, and not limitation, as well as the OS 50, one or more application programs, other program modules, and program data. Each of the operating system, one or more application programs, other program modules, and program data or some combination thereof, may include an implementation of a networking environment.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
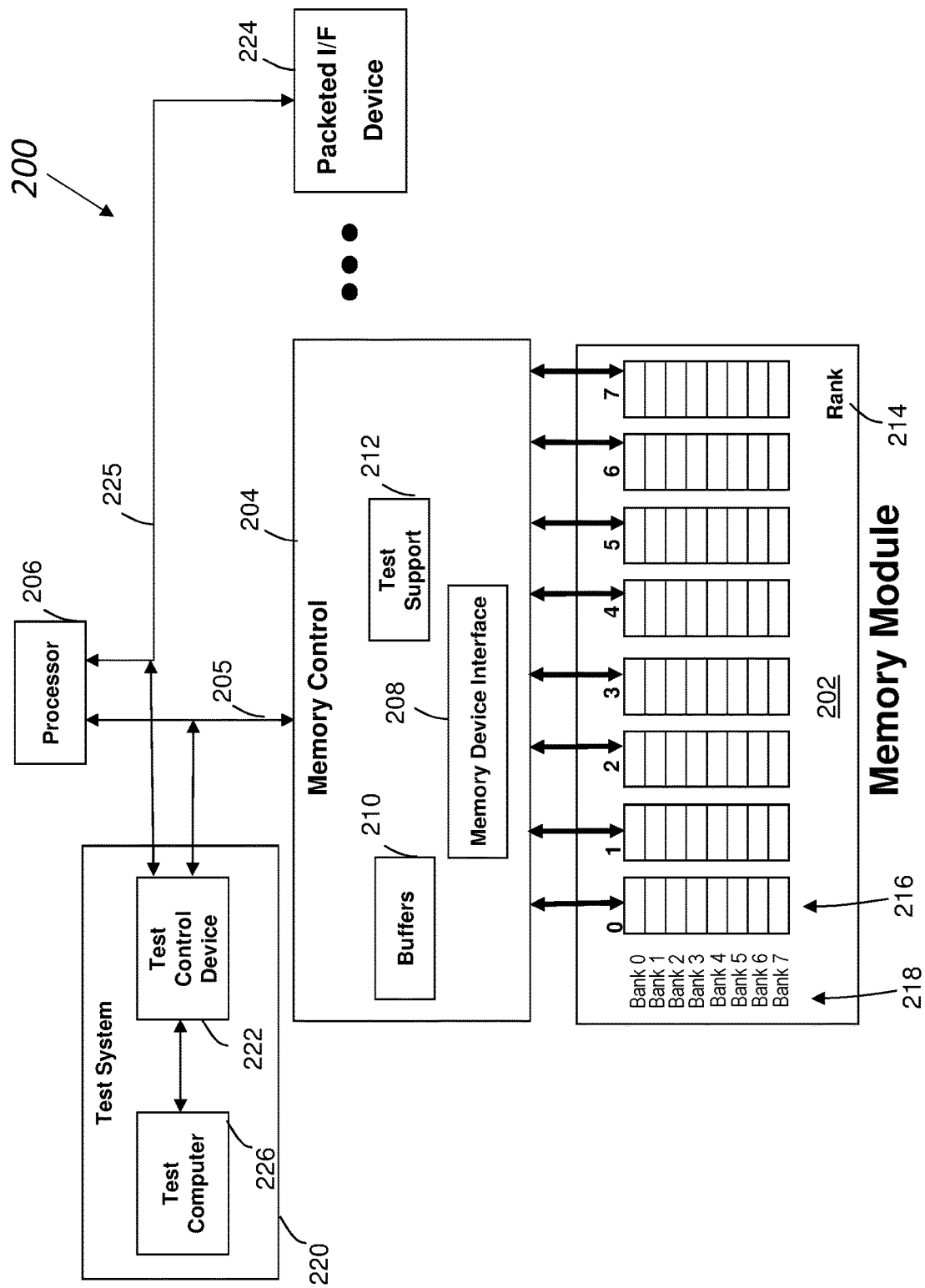
FIG. 2 is a block diagram of a test configuration according to a non-limiting embodiment.

Turning now to a more detailed description of aspects of the present invention, FIG. 2 depicts a block diagram of a test configuration 200 according to embodiments of the invention. The test configuration 200 can be a portion of the memory system 28 of FIG. 1 or another system. The test configuration 200 can include a memory module 202 connected to a memory control 204. The memory module 202 can be, for example, a DDR4 or DDR5 dual in-line memory module (DIMM). The memory control 204 can be part of the memory module 202 or separate from the memory module 202. The memory control 204 can receive commands, addresses, and data on a bus 205 from a processor 206, which can be part of the processor 16 of FIG. 1, where the memory module 202 is part of the computer system 10.

Memory devices 216 can be grouped into ranks 214, where each rank 214 defines a group of multiple memory devices 216 that share a common chip select, such that they are collectively accessed across a memory bus that spans a width greater than a data width supported individually by each memory device 216. For example, a rank 214 can include eight DRAM devices and an ECC device, where the ECC device is a type of memory device 216 that stores ECC values to support error detection and correction. Each memory device 216 can include addressable banks 218, where a typical memory access includes the same bank number accessed across all of the memory devices 216 in a selected rank 214.

Ranks 214 can be spread across different memory modules 202, such as DIMMs. Each DIMM can include one or more ranks 214. Rank 214, memory device 216, and bank 218 selection can be driven by a memory device interface 208 of the memory control 204. Commands and data can be temporarily queued in one or more buffers 210 of the memory control 204. For example, packets received on bus 205 can be temporarily stored in buffers 210 before the commands and/or data are passed to the memory device interface 208. Similarly, data received at the memory device interface 208 from the memory module 202 can be queued in buffers 210 before forming packets to transmit on the bus 205. The memory control 204 can also include test support 212 to perform, for example, a subset of built-in tests and/or to collect and report status information about the memory control 204 and memory module 202. However, the test support 212 may not have full memory system validation capabilities in order to reduce the complexity of the memory control 204.

The memory device interface 208 can generate command and control signals to access memory devices 216 and to perform error detection and correction. ECC or other known error correction codes may be used to detect and correct errors in words communicated to and from a memory device 216. For example, memory ECCs may use a combination of parity checks in various bit positions of a data word to allow detection and correction of errors.

The example of FIG. 2 depicts a rank 214 on the memory module 202, which includes a plurality of memory devices 216 that are further divided into a plurality of banks 218. Each bank 218 can include multiple rows in each of the memory devices 216. Although only one memory module 202 with eight memory devices 216 and eight banks 218 per memory device 216 are depicted in FIG. 2, it will be understood that there can be multiple memory modules 202 with various capacities and distributions of memory devices 216 with any number of banks 218.

To perform validation testing of the memory control 204 and memory module 202, a test system 220 can access the bus 205. In some embodiments, the test system 220 is coupled to the bus 205 in place of the processor 206. For example, where the memory control 204 and memory module 202 are implemented on a removable card, the card can be removed from a system that includes processor 206 and inserted into a system that includes test system 220 such that bus 205 is coupled to the test system 220 rather than the processor 206 during testing. Alternatively, the test system 220 may interface with the system (e.g., computer system 10 of FIG. 1), as a card or other type of interface attached to a system under test. The test system 220 can include a test control device 222 that is configurable to communicate with memory control 204 as a device under test using a packeted protocol. The test control device 222 may communicate with and test multiple devices under test in parallel, such as accessing one or more other packeted interface devices 224 on a bus 225 in combination with testing the memory control 204 and memory module 202 via bus 205. Further, the test control device 222 may also test the processor 206 and/or any other components reachable through a packeted interface. Although buses 205, 225 are depicted as single line, the buses 205, 225 can include multiple links in parallel, such as multiple high-speed SerDes links configured to communicate using a packet-based protocol.

The test control device 222 can be configured by a test computer 226, for example, by sending commands from the test computer 226 to the test control device 222. The test computer 226 may also collect test results from the test control device 222. The test control device 222 may also support a write-through mode, where the test computer 226 can directly issue commands that pass through the test control device 222 to a selected device under test, such as memory control 204 and/or packeted interface device 224.

It is to be understood that the block diagram of FIG. 2 is not intended to indicate that the test configuration 200 is to include all of the components shown in FIG. 2. Rather, the test configuration 200 can include any appropriate fewer or additional components not illustrated in FIG. 2, with some components shown in FIG. 2 combined or the functions performed by one or more components performed by different or several components. Further, the embodiments described herein with respect to test configuration 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
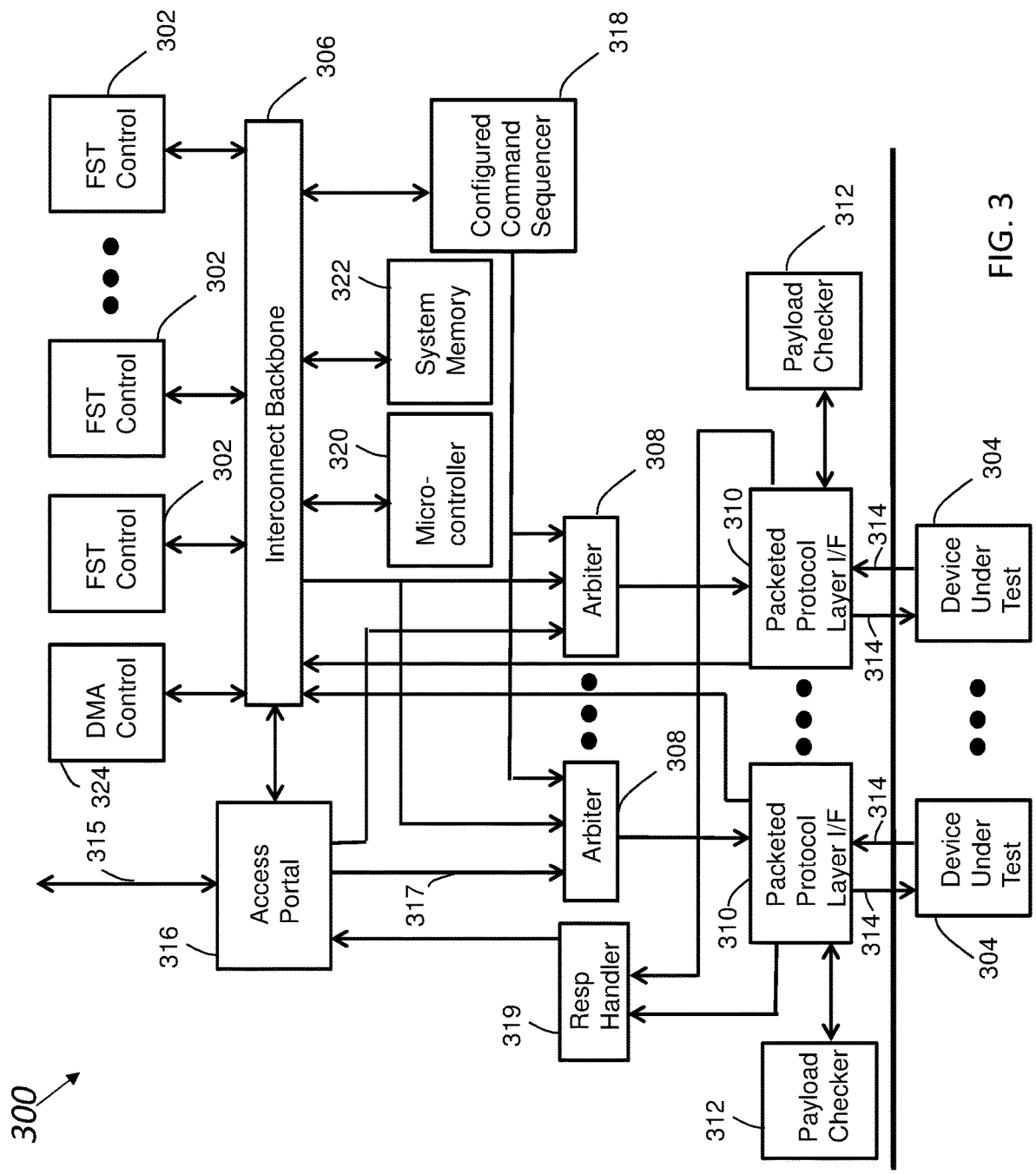
FIG. 3 is a block diagram of a test control device of a packeted protocol device test system according to a non-limiting embodiment.

FIG. 3 is a block diagram of a test control device 300 of a packeted protocol device test system, such as the test control device 222 of test system 220 of FIG. 2. The test control device 300 includes a plurality of functional self-test controllers 302 configured to generate test traffic as part of running a plurality of functional test cases in parallel on a plurality of devices under test 304. This test traffic is generated independently of the implementation of packeted protocol layer interfaces 310 and serves to test high-level commands targeting a variety of devices under test 304. These commands can be reads or writes of a programmable length performed targeting addresses in a programmable range and sequence, such as sequentially or pseudo-randomly, spaced by a programmable amount of cycles. These reads and writes can be done with several different fixed data patterns, fully programmable patterns, or a pseudo-random data pattern calculated deterministically from the target address. In total, each of the functional self-test controllers 302 can use these simple options to drastically alter the created traffic. For example, one controller can do high-frequency 128B writes to a single address space with all-zero data while a second controller can do infrequent 8B reads from a large section of memory and expect pseudo-random data back. Operating the functional self-test controllers 302 in parallel can further stress the devices under tests 304 and may be part of a larger coordinated test. An interconnect backbone 306 can be coupled to the functional self-test controllers 302. The interconnect backbone 306 can be an internal bus or buses of the test control device 300 that enables the commands and data to be exchanged between multiple components in parallel.

The test control device 300 can also include a plurality of arbiters 308 coupled to the interconnect backbone 306. The test control device 300 can also include a plurality of packeted protocol layer interfaces 310 coupled to the arbiters 308. The arbiters 308 can select traffic from multiple sources for routing to the packeted protocol layer interfaces 310. Source select can be managed by the arbiters 308 to limit the traffic flow and avoid starving any of the sources. The packeted protocol layer interfaces 310 can be configured to perform one or more protocol specific conversions between the test traffic and a device-specific packeted protocol of each of the devices under test 304. A plurality of payload checkers 312 of the test control device 300 can be configured to verify responses of the devices under test 304 to the functional test cases. In embodiments of the invention, the packeted protocol layer interfaces 310 can be configured to communicate with the devices under test 304 on separate high-speed serial communication links 314, such as differential HSS physical links.

The test control device 300 of FIG. 3 also includes an access portal 316 to support an alternate path 317 to pass through the packeted protocol layer interfaces 310 to the devices under test 304 independent of the functional self-test controllers 302. A response handler 319 of the test control device 300 can convert a response from the packeted protocol layer interfaces 310 into a format compatible with the access portal 316 prior to outputting the response to the access portal 316. The access portal 316 can communicate with an external computer system, such as the test computer 226 of FIG. 2, via link 315. The alternate path 317 can reduce delays of passing commands and data between the access portal 316 and the packeted protocol layer interfaces 310 by bypassing the interconnect backbone 306.

A configured command sequencer 318 can be coupled to the interconnect backbone 306. The configured command sequencer 318 is operable to issue one or more commands to mix with the test traffic by the arbiters 308 as part of executing a sequence of tests. A microcontroller 320 can be coupled to the interconnect backbone 306, where the microcontroller 320 is operable to execute a plurality of instructions to configure the test control device 300. Instructions can be loaded through the access portal 316 and may result in configuring the configured command sequencer 318 and/or the functional self-test controllers 302, for example. For instance, the access portal 316 may provide external interface support (e.g., through firmware or other techniques) to configure the test control device 300 and/or interface with the packeted protocol layer interfaces 310 through arbiters 308. A system memory 322 can be coupled to the interconnect backbone 306, where the system memory 322 is operable to collect a plurality of test results. For example, if a sequence of tests is programmed by the microcontroller 320, the results of the tests may be buffered within the system memory 322 until the system memory 322 is read through the access portal 316. A direct memory access controller 324 is configurable to interact with at least one of the packeted protocol layer interfaces 310. The direct memory access controller 324 may support testing of command sequences and responses of devices under test 304 that attempt to interface with a direct memory access controller expected to be part of a system of the devices under test 304 during normal operation. Further, the direct memory access controller 324 may support transfers between two or more devices under test 304.

In exemplary embodiments, the functional self-test controllers 302 serve as high-throughput mainline traffic generators which create protocol-agnostic traffic that can include a command (read or write), command tag, address, data, and data length. Each of the functional self-test controllers 302 can be configured independently with a static command and a method of generating addresses. During run time, the functional self-test controllers 302 can be arbitrated between using a configurable process. Data can be generated deterministically from the address such that any of the functional self-test controllers 302 can determine the expected data regardless of how address spaces overlap between the functional self-test controllers 302. Commands from the functional self-test controllers 302 can be broadcast to multiple ports.

When commands are dispatched, the commands can also be stored while waiting for a response. When the response is received, the response code is checked and, in the case of a read, the data is checked as well. In the event of a miscompare, the error is logged, and the test run is marked as a failure. Each port can have independent checking. Because functional self-test controllers 302 generate protocol-agnostic traffic, the functional self-test controllers 302 can attach to any interface which supports random writes and reads with deterministic data. Checking of test results can be implemented in payload checkers 312, which may receive protocol-agnostic responses after passing through the packeted protocol layer interfaces 310. As one example, Open Coherent Accelerator Processor Interface (OpenCAPI) and Open Memory Interface (OMI) can be used to provide a technology-agnostic and low-latency interface to drive traffic to a memory buffer and memory devices, such as the memory control 204 and memory devices 216 of FIG. 2. However, it will be understood that embodiments of the invention can be used with any type of storage or memory by replacing the protocol layer to implement protocol-specific traffic.

The configured command sequencer 318 can support generation of lower-level commands to exercise operations in a deterministic fashion. The deterministic operational sequence and cycle-by-cycle accuracy of the configured command sequencer 318 can enable precise control that may not be achievable by the functional self-test controllers 302. The configured command sequencer 318 can be implemented as a programmable array that allows a sequence of commands to be specified at the required protocol level and observe the responses. Commands can be encoded into this array and then sent over to the packeted protocol layer interfaces 310 in the programmed order with cycle-by-cycle accuracy. During the execution of this sequence, arbiters 308 select configured command sequencer 318 to ensure the sequence of commands is sent as programmed. Encoded commands can be any command supported by the packeted protocol layer interfaces 310, such as memory reads, memory writes, configuration reads, configuration writes, interrupts, or messages with any associated data length, addressing and identification information. Not all command encodings may be supported by every implementation of the packeted protocol layer interfaces 310. The encoded command also includes any operands required to accompany the command. Responses are captured in a similar array, and response packets are available to be read out and analyzed by the user.

It is to be understood that the block diagram of FIG. 3 is not intended to indicate that the test control device 300 is to include all of the components shown in FIG. 3. Rather, the test control device 300 can include any appropriate fewer or additional components not illustrated in FIG. 3, with some components shown in FIG. 3 combined or the functions performed by one or more components performed by different or several components. Further, the embodiments described herein with respect to test control device 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 4 is a block diagram of a test control device 400 of a packeted protocol device test system, such as the test control device 222 of test system 220 of FIG. 2. The test control device 400 illustrates a simplified version of the test control device 300 of FIG. 3. Rather than providing the alternate path 317 and response handler 319, the test control device 400 routes all traffic associated with the access portal 316 through the interconnect backbone 306. This may simplify the design of the test control device 400 as compared to the test control device 300. However, the test computer 226 of FIG. 2 or the microcontroller 320 embedded within the test control device 400 may handle format conversions or buffering that would otherwise be handled by the response handler 319.

It is to be understood that the block diagram of FIG. 4 is not intended to indicate that the test control device 400 is to include all of the components shown in FIG. 4. Rather, the test control device 400 can include any appropriate fewer or additional components not illustrated in FIG. 4, with some components shown in FIG. 4 combined or the functions performed by one or more components performed by different or several components. Further, the embodiments described herein with respect to test control device 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Turning now to FIG. 5, a flow diagram of a process 500 is generally shown in accordance with an embodiment. The process 500 is described with reference to FIGS. 1-5 and may include additional steps beyond those depicted in FIG. 5. The process 500 can be performed by the test control device 222, 300, 400 of FIGS. 2-4 and/or can be controlled through the access portal 316 of FIGS. 3 and 4.

At block 502, a plurality of functional self-test controllers 302 can be configured in a test control device 222, 300, 400 to run a plurality of functional test cases in parallel on a plurality of devices under test 304. The functional self-test controllers 302 can be configured by the microcontroller 320 and/or the test computer 226.

At block 504, arbiters 308 can arbitrate test traffic between the functional self-test controllers 302 and a plurality of packeted protocol layer interfaces 310 of test control device 222, 300, 400.

At block 506, one or more protocol specific conversions can be performed between the test traffic and a device-specific packeted protocol of each of the devices under test 304. For example, traffic received at the packeted protocol layer interfaces 310 may be formatted in an unpacketed format and may be converted to a packeted format by the packeted protocol layer interfaces 310. The packeted protocol layer interfaces 310 can be reconfigurable such that as different devices under test 304 using different protocols are to be tested, a corresponding instance of the packeted protocol layer interfaces 310 can be reprogrammed accordingly.

At block 508, payload checking can be performed by payload checkers 312 between the packeted protocol layer interfaces 310 and the devices under test 304 to verify responses of the devices under test 304 to the functional test cases. Payload checking may include verifying expects data values, addresses, status information, and other such information.

At block 510, an access portal 316 can be serviced to provide an external interface to the test control device 222, 300, 400. The access portal 316 can support an alternate path 317 to pass through the packeted protocol layer interfaces 310 to the devices under test 304 independent of the functional self-test controllers 302. In some embodiments, the alternate path 317 can be excluded, such as in test control device 400. The access portal 316 provides an external interface to configure the test control device 222, 300, 400 and/or may interface with the packeted protocol layer interfaces 310 through arbiters 308.

At block 512, a configured command sequencer 318 can be configured to execute one or more test cases through the packeted protocol layer interfaces 310, where the test cases may be separate from the functional self-test controllers 302 and the access portal 316. Embodiments can include converting, by a response handler 319 of the test control device 300, a response from the packeted protocol layer interfaces 310 into a format compatible with the access portal 316 prior to outputting the response to the access portal 316.

Test traffic can be routed through an interconnect backbone 306 of the test control device 222, 300, 400 to an arbiter 308 associated with one of the packeted protocol layer interfaces 310. The arbiter 308 can mix the test traffic from the interconnect backbone 306 with one or more commands issued by the configured command sequencer 318. The configured command sequencer 318 is configurable to execute a sequence of tests. A response from the packeted protocol layer interfaces 310 can be provided to the interconnect backbone 306. The test control device 222, 300, 400 can be configured based on a microcontroller 320 executing a plurality of instructions, where the microcontroller 320 is coupled to the interconnect backbone 306. A plurality of test results can be collected in a system memory 322, where the system memory 322 is coupled to the interconnect backbone 306. A direct memory access controller 324 of the test control device 222, 300, 400 can interact with at least one of the packeted protocol layer interfaces 310.

The process flow diagram of FIG. 5 is not intended to indicate that the operations of the process 500 are to be executed in any particular order, or that all of the operations of the process 500 are to be included in every case. Additionally, the process 500 can include any suitable number of additional operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
configuring a plurality of functional self-test controllers in a test control device to run a plurality of functional test cases in parallel on a plurality of devices under test;
arbitrating test traffic between the functional self-test controllers and a plurality of packeted protocol layer interfaces of the test control device, the arbitrating comprising routing the test traffic through an interconnect backbone of the test control device to an arbiter associated with one of the packeted protocol layer interfaces, wherein the arbiter comprises circuitry of the test control device that receives traffic from multiple sources and selects and limits traffic flow to the one of the packeted protocol layer interfaces;
performing one or more protocol specific conversions between the test traffic and a device-specific packeted protocol of each of the devices under test; and
performing payload checking between the packeted protocol layer interfaces and the devices under test to verify responses of the devices under test to the functional test cases.

2. The method of claim 1, further comprising:
servicing an access portal to support an alternate path to pass through the packeted protocol layer interfaces to the devices under test independently of the functional self-test controllers; and
converting, by a response handler of the test control device, a response from the packeted protocol layer interfaces into a format compatible with the access portal prior to outputting the response to the access portal.

3. The method of claim 1, wherein the test control device comprises a plurality of arbiters each coupled to the interconnect backbone and a different one of the packeted protocol layer interfaces.

4. The method of claim 3, further comprising:
interfacing an access portal with the interconnect backbone, the access portal providing an external interface to the test control device.

5. The method of claim 3, further comprising:
mixing, at the arbiter, the test traffic from the interconnect backbone with one or more commands issued by a configured command sequencer of the test control device, wherein the configured command sequencer comprises a programmable array.

6. The method of claim 5, wherein the configured command sequencer is configurable to execute a sequence of tests.

7. The method of claim 3, further comprising:
providing a response from the packeted protocol layer interfaces to the interconnect backbone.

8. The method of claim 3, further comprising:
configuring the test control device based on a microcontroller executing a plurality of instructions, wherein the microcontroller is coupled to the interconnect backbone; and
collecting a plurality of test results in a system memory, wherein the system memory is coupled to the interconnect backbone.

9. The method of claim 1, further comprising:
configuring a direct memory access controller of the test control device to interact with at least one of the packeted protocol layer interfaces.

10. A test control device comprising:
a plurality of functional self-test controllers configured to generate test traffic as part of running a plurality of functional test cases in parallel on a plurality of devices under test;
an interconnect backbone coupled to the functional self-test controllers;
a plurality of arbiters coupled to the interconnect backbone;
a plurality of packeted protocol layer interfaces coupled to the arbiters, wherein the packeted protocol layer interfaces are configured to perform one or more protocol specific conversions between the test traffic and a device-specific packeted protocol of each of the devices under test, and further wherein the arbiters comprise circuitry that receives traffic from multiple sources and selects and limits traffic flow to the packeted protocol layer interfaces; and
a plurality of payload checkers configured to verify responses of the devices under test to the functional test cases.

11. The test control device of claim 10, wherein the packeted protocol layer interfaces are configured to communicate with the devices under test on separate high-speed serial communication links.

12. The test control device of claim 10, further comprising:
an access portal to support an alternate path to pass through the packeted protocol layer interfaces to the devices under test independently of the functional self-test controllers.

13. The test control device of claim 10, further comprising:
a configured command sequencer coupled to the interconnect backbone, the configured command sequencer operable to issue one or more commands to mix with the test traffic by the arbiters as part of executing a sequence of tests, wherein the configured command sequencer comprises a programmable array.

14. The test control device of claim 10, further comprising:
a microcontroller coupled to the interconnect backbone, wherein the microcontroller is operable to execute a plurality of instructions to configure the test control device; and
a system memory coupled to the interconnect backbone, the system memory operable to collect a plurality of test results.

15. The test control device of claim 10, further comprising:
a direct memory access controller configurable to interact with at least one of the packeted protocol layer interfaces.

16. A computer program product comprising a computer readable storage medium having program instructions embodied therewith, the program instructions executable by processing circuitry to perform a plurality of operations comprising:
configuring a plurality of functional self-test controllers in a test control device to run a plurality of functional test cases in parallel on a plurality of devices under test;
arbitrating test traffic between the functional self-test controllers and a plurality of packeted protocol layer interfaces of the test control device, the arbitrating comprising routing the test traffic through an interconnect backbone of the test control device to an arbiter associated with one of the packeted protocol layer interfaces, wherein the arbiter comprises circuitry of the test control device that receives traffic from multiple sources and selects and limits traffic flow to the one of the packeted protocol layer interfaces;
performing one or more protocol specific conversions between the test traffic and a device-specific packeted protocol of each of the devices under test; and
performing payload checking between the packeted protocol layer interfaces and the devices under test to verify responses of the devices under test to the functional test cases.

17. The computer program product of claim 16, wherein the operations further comprise:
servicing an access portal to support an alternate path to pass through the packeted protocol layer interfaces to the devices under test independently of the functional self-test controllers.

18. The computer program product of claim 16, wherein the operations further comprise:
mixing, at the arbiter, the test traffic from the interconnect backbone with one or more commands issued by a configured command sequencer of the test control device, wherein the configured command sequencer comprises a programmable array configurable to execute a sequence of tests.

19. The computer program product of claim 18, wherein the operations further comprise:
collecting a plurality of test results in a system memory, wherein the system memory is coupled to the interconnect backbone.

20. The computer program product of claim 16, wherein the operations further comprise:
configuring a direct memory access controller of the test control device to interact with at least one of the packeted protocol layer interfaces.

* * * * *